United States Patent
Hoffmann

(10) Patent No.: US 9,868,496 B2
(45) Date of Patent: Jan. 16, 2018

(54) DRIVE SYSTEM FOR A WATER VEHICLE, METHOD FOR OPERATING A DRIVE SYSTEM, AND WATER VEHICLE HAVING THE DRIVE SYSTEM

(71) Applicant: Siemens Aktiengesellschaft, Munich (DE)

(72) Inventor: Joachim Hoffmann, Burgthann (DE)

(73) Assignee: Siemens Aktiengesellschaft, Munich (DE)

( * ) Notice: Subject to any disclaimer, the term of this patent is extended or adjusted under 35 U.S.C. 154(b) by 71 days.

(21) Appl. No.: 14/913,083

(22) PCT Filed: May 8, 2014

(86) PCT No.: PCT/EP2014/059472
§ 371 (c)(1),
(2) Date: Feb. 19, 2016

(87) PCT Pub. No.: WO2015/024678
PCT Pub. Date: Feb. 26, 2015

(65) Prior Publication Data
US 2016/0207599 A1    Jul. 21, 2016

(30) Foreign Application Priority Data
Aug. 21, 2013    (EP) .................................. 13181188

(51) Int. Cl.
*B63G 8/08*    (2006.01)
*B63H 21/00*    (2006.01)

(52) U.S. Cl.
CPC ............. *B63G 8/08* (2013.01); *B60L 2200/32* (2013.01); *B63H 2021/003* (2013.01); *Y02T 90/38* (2013.01)

(58) Field of Classification Search
CPC ............. B63H 2021/003; B63H 21/17; B63H 2021/202; B63G 8/08; B60L 11/18; B60L 11/1881; B60L 11/1896; B60L 11/1898; B60L 2200/32; Y02T 90/30; Y02T 90/32; Y02T 90/34; Y02T 90/36; Y02T 90/38
See application file for complete search history.

(56) References Cited

U.S. PATENT DOCUMENTS

| | | | | |
|---|---|---|---|---|
| 7,037,609 B2 * | 5/2006 | Sugawara | ......... | H01M 8/04097 429/415 |
| 7,938,077 B1 | 5/2011 | Dunn et al. | | |
| 8,101,321 B2 * | 1/2012 | Hinsenkamp | ..... | H01M 8/04097 429/502 |

(Continued)

*Primary Examiner* — Ajay Vasudeva
(74) *Attorney, Agent, or Firm* — Cozen O'Connor

(57) ABSTRACT

A drive system for a water vehicle, in particular for a submarine underwater vehicle or an unmanned underwater vehicle, includes a fuel cell system, at least one operating-gas container for supplying the fuel cell system with an operating gas, and a compressor arranged on a gas discharge line for compressing a residual gas from the fuel cell system, wherein a turbine arranged between the operating-gas container and the fuel cell system is provided for expanding the operating gas before the operating gas enters the fuel cell system, where the compressor is driven by the turbine such that the energy balance of the drive system is thereby improved.

23 Claims, 2 Drawing Sheets

(56) References Cited

U.S. PATENT DOCUMENTS

2003/0113602 A1* 6/2003 Nau .................... B60L 11/1881
                                                                   429/416
2012/0094202 A1* 4/2012 Rethore ................ B63G 8/08
                                                                   429/444

* cited by examiner

DRIVE SYSTEM FOR A WATER VEHICLE, METHOD FOR OPERATING A DRIVE SYSTEM, AND WATER VEHICLE HAVING THE DRIVE SYSTEM

CROSS-REFERENCE TO RELATED APPLICATIONS

This is a U.S. national stage of application No. PCT/EP2014/059472 filed 8 May 2014. Priority is claimed on European Application No. 13181188 filed 21 Aug. 2013, the content of which is incorporated herein by reference in its entirety.

BACKGROUND OF THE INVENTION

1. Field of the Invention

The invention relates to a drive system for a water vehicle, in particular for an underwater vehicle such as a submarine or an unmanned underwater vehicle and further relates to a method for operating such a drive system and to a water vehicle having such a drive system.

2. Description of the Related Art

Underwater vehicles, such as submarines, are equipped inter alia with fuel cell systems, by which energy is generated to operate the vehicle. The fuel cell system is supplied with pure hydrogen and oxygen or with gases containing hydrogen or oxygen, which are the operating gases. There are several possibilities of storing the operating gases, hydrogen and oxygen, such as in the form of liquefied gases in cryotanks, in the form of compressed gases in pressure vessels or ad/absorbed on/in a substrate, such as in a metal hydride storage unit.

During operation of a drive system of an underwater vehicle based on the combustion of hydrogen and oxygen, each operating gas is removed, e.g., from an operating gas container, in which it is stored at high pressure, and routed into the fuel cell system. In the fuel cell system, both operating gases react to product water. Remaining, uncombusted residual gases escape from a gas outlet of the fuel cell system and must be disposed of. The disposal can take place in two ways, by releasing either (i) into the atmosphere or the surroundings or (ii) into suitable storage containers. This gas outlet only works if either a sufficient volume is available for the storage container or the surrounding atmosphere absorbs a sufficiently large volume so that the escaping gases are diluted.

However, in the case of an underwater vehicle, the volume is limited. A discharge of the residual gas into the water is also not easily possible, because the residual gas may have to be routed out of the interior of the underwater vehicle against the hydrostatic pressure present on the outside. If the operating pressure of the fuel cell system is not sufficiently large for this to be possible, the residual gas is compressed. Electrically driven machines which, however, consume part of the electrical energy generated in the fuel cell system, are generally used as compressors.

SUMMARY OF THE INVENTION

Accordingly, it is an object of the present invention to improve the energy balance of a drive system of an underwater vehicle.

This and other objects and advantages are achieved in accordance with the invention by a drive system for a water vehicle, in particular for an underwater vehicle such as a submarine or an unmanned underwater vehicle, comprising a fuel cell system, at least one operating gas container for supplying the fuel cell system with an operating gas, a turbine arranged between the operating gas container and the fuel cell system for depressurizing the operating gas before the gas enters the fuel cell system and a compressor for compressing a residual gas from the fuel cell system, where the compressor and the turbine have a shared transmission system.

The object is also achieved in accordance with the invention by a method for operating a drive system for a water vehicle, in particular for an underwater vehicle such as a submarine or an unmanned underwater vehicle, where an operating gas from at least one operating gas container is depressurized in a turbine, the depressurized operating gas is then introduced into a fuel cell system for combustion, and residual gas is discharged from the fuel cell system after combustion of the operating gas in the fuel cell system and is compressed via a compressor, where the compressor is driven by the turbine.

It is also an object of the invention to provide a water vehicle, i.e., an underwater vehicle, such as a submarine or an unmanned underwater vehicle having the above-described drive system.

The advantages and preferred embodiments cited below in respect of the drive system can be analogously transferred to the method for operating a drive system and to the water vehicle having such a drive system.

A water vehicle is understood here to mean both a surface vessel as well as a ship or an underwater vehicle such as a submarine or an unmanned underwater vehicle.

The invention is based on the idea of depressurizing the operating gas downstream of the operating gas container and using the expansion work to drive the compressor by way of the turning of the turbine via the transmission system. In this way, an electrically driven motor is dispensed with for the compressor, so that overall less electrical energy is consumed. Here, the transmission system particularly also comprises a transmission gearing, which is arranged between the expansion turbine and the compressor. It is also conceivable to arrange the turbine and the compressor on a shared shaft.

During operation, more operating gas enters the fuel cell system than the residual gas that leaves the fuel cell system. In a cascaded fuel cell arrangement, approx. 99% of the operating gases is generally converted internally and only approx. 1% of the operating gases leave as residual gas. This quantity of residual gas can be increased relatively easily to a required pressure level via the depressurization compressor process and can be fed out of the underwater vehicle into the surrounding sea.

The operating gas upstream of the turbine preferably has a pressure of at least approx. 200 bar, approx. 350, in particular approx. 700 and downstream of the turbine a pressure of approx. 5-10 bar. To this end, pressurized storage containers with an initial fill pressure of approx. 350 bar are provided on the hydrogen side. For the oxygen side, pressurized storage containers with a pressure in particular between 200 and 350 bar are required. It is also possible to use special containers with a pressure up to 700 bar on the hydrogen and/or oxygen side. Depending on the container used, there can be a different initial pressure on the hydrogen side and the oxygen side. This pressure drops with the increasing consumption of the respective operating gas. The compression operation can operate meaningfully up to a lower value, in particular up to approx. 20-50 bar. The ratio between the depressurized quantity of operating gas and the compressed quantity of residual gas is approx. 100:1. As a result, sufficient energy to operate the compressor is also available in the lower pressure range for the initial pressure of the operating gas.

A depressurization apparatus for pre-depressurizing the operating gas to a pressure between 20 bar and 50 bar is preferably arranged between the operating gas container and the turbine. This arrangement is advantageous in that a constant primary pressure is established across a further region on the depressurization side, which is independent of the initial pressure of the operating gas.

The compressed residual gas expediently has a pressure of approx. 5-50 bar. This pressure level is sufficient to feed the residual gas at an immersion depth that is typical for an underwater vehicle, i.e., at an immersion depth of 50-500 m, out of the underwater vehicle into the surrounding sea water.

In accordance with a preferred embodiment, a gas container for the residual gas is provided at the gas outlet. The gas container is particularly formed as a pressure vessel and is arranged downstream of the compressor to receive the compressed residual gas. The gas container is alternatively connected upstream of the compressor, so that a sufficient quantity of residual gas is collected before being compressed.

In a further preferred embodiment, the compressed residual gas is routed out of the underwater vehicle, by the gas outlet, on which the compressor is arranged, opening to the exterior of the underwater vehicle.

An electric generator is advantageously coupled to the turbine and is driven by the turbine. The excess mechanical energy is thus converted into electrical energy, which could unburden the fuel cell system for instance, and in emergencies electricity could be generated via the generator provided the pressure on the input side of the turbine is sufficiently high. In particular, the generator is configured such that its power is likewise reduced as pressure reduces.

The excess mechanical energy of the turbine is moreover used for direct drive support, by the turbine expediently being coupled to a drive propeller of the vehicle. A combination of a drive propeller driven directly by the turbine and an electric generator coupled to the turbine is also possible.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is explained in more detail based on the drawings, in which.

DETAILED DESCRIPTION OF THE EXEMPLARY EMBODIMENTS

Figure 1:
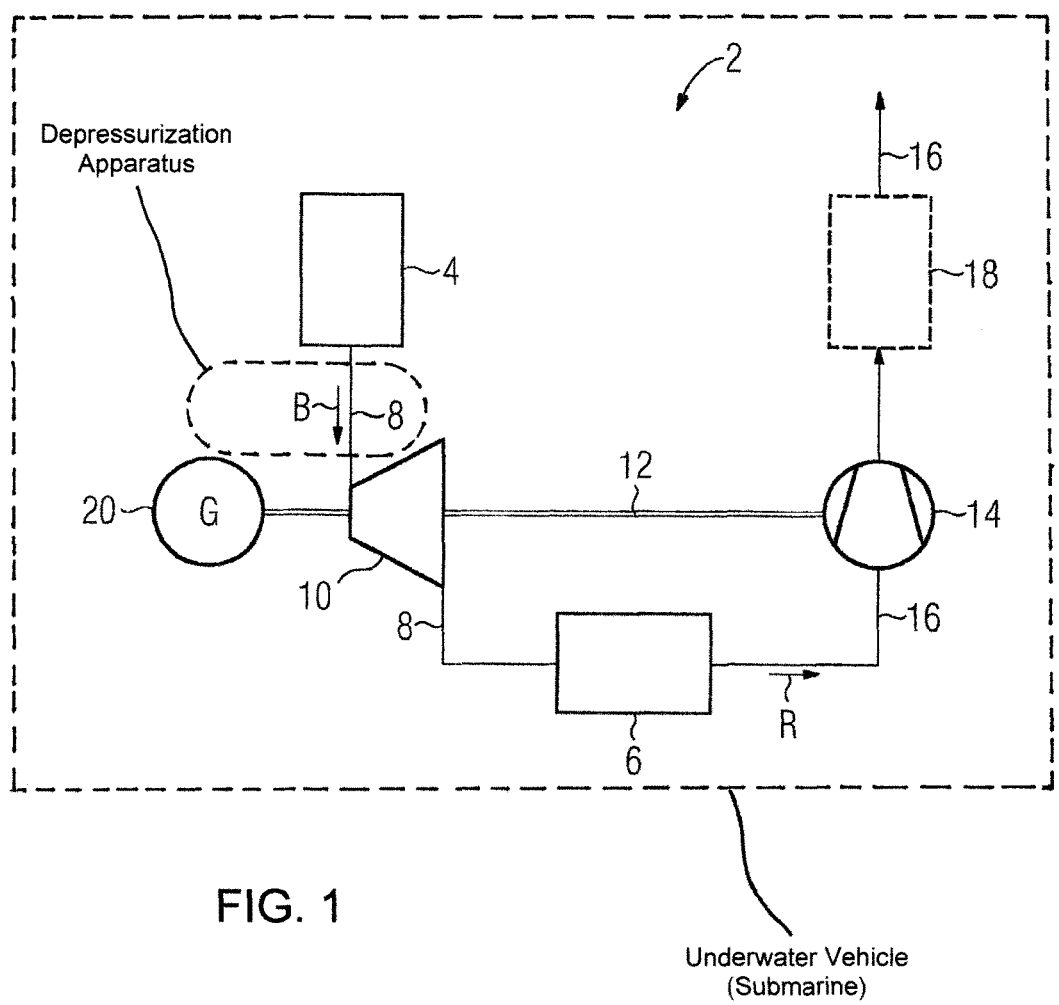
FIG. 1 schematically shows a drive system 2 for an underwater vehicle in accordance with the invention.

FIG. 1 is a schematic block diagram of a drive system 2 for an underwater vehicle (not shown here in more detail), comprising an operating gas container 4 and a fuel cell system 6. In the exemplary embodiment shown, the operating gas container 4 is a pressure vessel, in which the hydrogen is stored at high pressure. An operating gas B, in particular hydrogen, is routed into the fuel cell system 6 via an operating gas line 8, where the operating gas B reacts with the other operating gas, in this case oxygen. An operating gas container is in particular likewise provided for the operating gas (oxygen), although this is not shown in the figure.

In the operating gas container 4, the hydrogen is at an initial pressure between 350 bar. A turbine 10 is arranged on the operating gas line 8, through which turbine 10 the hydrogen flows on its way to the fuel cell system 6. The hydrogen is depressurized to approx. 5-10 bar in the turbine 10, before being supplied to the fuel cell system 6.

The turbine 10 has a transmission system 12, which is shown symbolically here as a turbine shaft, on which a compressor 14 is likewise arranged. The compressor 14 serves to compress unused residual gas R from the fuel cell system 6 in order to be able to feed this, against the pressure of the water, if the underwater vehicle is submersed, into the seawater. The residual gas R is compressed to approx. 5-20 bar with the aid of the compressor 14. Here, the pressure of the compressed residual gas particularly depends on the immersion depth. The compressor 14 is arranged here at a gas outlet 16, by which the residual gas R is routed out of the fuel cell system 6 and which, in particular, opens to the exterior of the underwater vehicle.

A further gas container 18 arranged further downstream of the compressor 14 is also shown in the figure with a dashed line, with the gas container optionally being able to be integrated in the gas outlet 16. The gas container 18 serves to store the residual gas R internally before it is discharged out of the underwater vehicle. Alternatively, the gas outlet 16 can lead only as far as the gas container 18 so that any residual gas R present in the fuel cell system 6 is stored at high pressure in the gas container 18 on board the underwater vehicle until the gas container 18 can be emptied or replaced.

In the exemplary embodiment shown, the excess mechanical energy of the turbine is moreover used to drive an electric generator 20, which is integrated in the energy system of the underwater vehicle. The turbine 10 can moreover be used for direct drive support, by it being mechanically connected, for instance, to a drive propeller (not shown in more detail here).

By coupling the turbine 10 to the compressor 14, the drive system 2 is provided with a high energy efficiency, because no additional electric motor is required for operation of the compressor 14.

Figure 2:
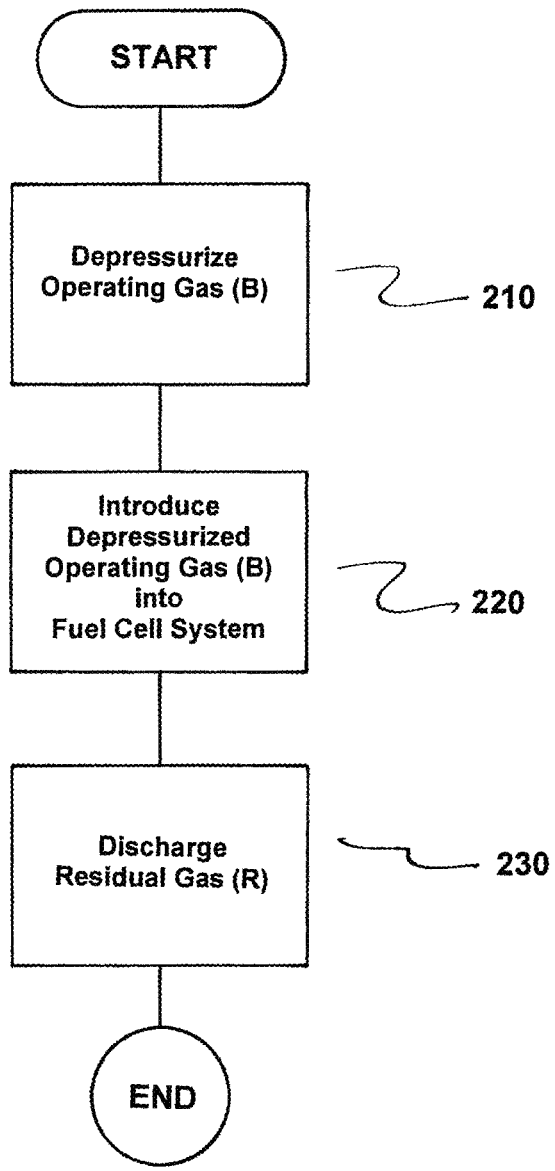
FIG. 2 is a flow chart of the method in accordance with the invention.

FIG. 2 is a flowchart of a method for operating a drive system (2) for a water vehicle. The method comprises depressurizing an operating gas (B) from at least one operating gas container (4) in a turbine (10), as indicated in step 210. Next, the depressurized operating gas (B) is introduced into a fuel cell system (6) for combustion, as indicated in step 220.

Residual gas (R) is then discharged from the fuel cell system (6) after combustion of the operating gas (B) in the fuel cell system (6) and the residual gas (R) is compressed via a compressor (14), as indicated in step 230. In accordance with the invention, the compressor (14) is driven by the turbine (10).

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended for all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A drive system for an underwater vehicle, comprising:
   a fuel cell system;
   at least one operating gas container for supplying the fuel cell system with an operating gas;
   a turbine arranged between the operating gas container and the fuel cell system for depressurizing the operating gas before said operating gas enters the fuel cell system; and
   a compressor arranged at a gas outlet for compressing a residual gas from the fuel cell system;
   wherein the compressor and the turbine have a shared transmission system; and
   wherein the gas outlet opens to an exterior of the underwater vehicle.

2. The drive system as claimed in claim 1, wherein the operating gas upstream of the turbine has a pressure of at least approximately 200 bar and downstream of the turbine a pressure of approximately 5-10 bar.

3. The drive system as claimed in claim 2, wherein the operating gas upstream of the turbine has a pressure of approximately 350 bar.

4. The drive system as claimed in claim 2, wherein the operating gas upstream of the turbine has a pressure of approximately 700 bar.

5. The drive system as claimed in claim 1, further comprising:
   a depressurization apparatus for pre-depressurizing the operating gas to a pressure between 20 bar and 50 bar arranged between the operating gas container and the turbine.

6. The drive system as claimed in claim 1, wherein the compressed residual gas has a pressure of approximately 5-50 bar.

7. The drive system as claimed in claim 1, furthering comprising:
   a gas container for the residual gas is arranged at the gas outlet.

8. The drive system as claimed in claim 1, further comprising:
   an electric generator operatively coupled to the turbine.

9. The drive system as claimed in claim 1, wherein the turbine is operatively coupled to a drive of the underwater vehicle.

10. The drive system as claimed in claim 1, wherein the underwater vehicle is a submarine or an unmanned underwater vehicle.

11. A method for operating a drive system for an underwater vehicle, the method comprising:
    depressurizing an operating gas from at least one operating gas container in a turbine;
    introducing the depressurized operating gas into a fuel cell system for combustion; and
    discharging residual gas from the fuel cell system after combustion of the operating gas in the fuel cell system and compressing the residual gas via a compressor;
    wherein the compressor is driven by the turbine; and
    wherein the compressed residual gas is routed out of the underwater vehicle.

12. The method as claimed in claim 11, wherein the operating gas in the turbine is depressurized from a pressure of at least approximately 200 bar.

13. The method as claimed in claim 12, wherein the operating gas upstream of the turbine is pre-depressurized to a pressure between 20 bar and 50 bar.

14. The method as claimed in claim 11, wherein the operating gas in the turbine is depressurized from a pressure of at least approximately 350 bar.

15. The method as claimed in claim 11, wherein the operating gas in the turbine is depressurized from a pressure of at least approximately 700 bar.

16. The method as claimed in claim 11, wherein the operating gas upstream of the turbine is pre-depressurized to a pressure between 20 bar and 50 bar.

17. The method as claimed in claim 11, wherein the residual gas is compressed to a pressure of approx. 5-50 bar.

18. The method as claimed in claim 11, wherein the residual gas is stored in a gas container.

19. The method as claimed in claim 11, wherein an electric generator is driven by the turbine.

20. The method as claimed in claim 11, wherein a drive of the underwater vehicle is driven by the turbine.

21. The method as claimed in claim 11, wherein the underwater vehicle comprises a submarine or an unmanned underwater vehicle.

22. An underwater vehicle having a drive system, the drive system comprising:
    a fuel cell system;
    at least one operating gas container for supplying the fuel cell system with an operating gas;
    a turbine arranged between the operating gas container and the fuel cell system for depressurizing the operating gas before said operating gas enters the fuel cell system; and
    a compressor arranged at a gas outlet for compressing a residual gas from the fuel cell system;
    wherein the compressor and the turbine have a shared transmission system; and
    wherein the gas outlet opens to an exterior of the underwater vehicle.

23. The underwater vehicle of claim 22, wherein the underwater vehicle is a submarine or an unmanned underwater vehicle.

* * * * *